Nov. 13, 1945.  E. F. NELSON  2,388,931
FRACTIONATION
Filed Jan. 31, 1944
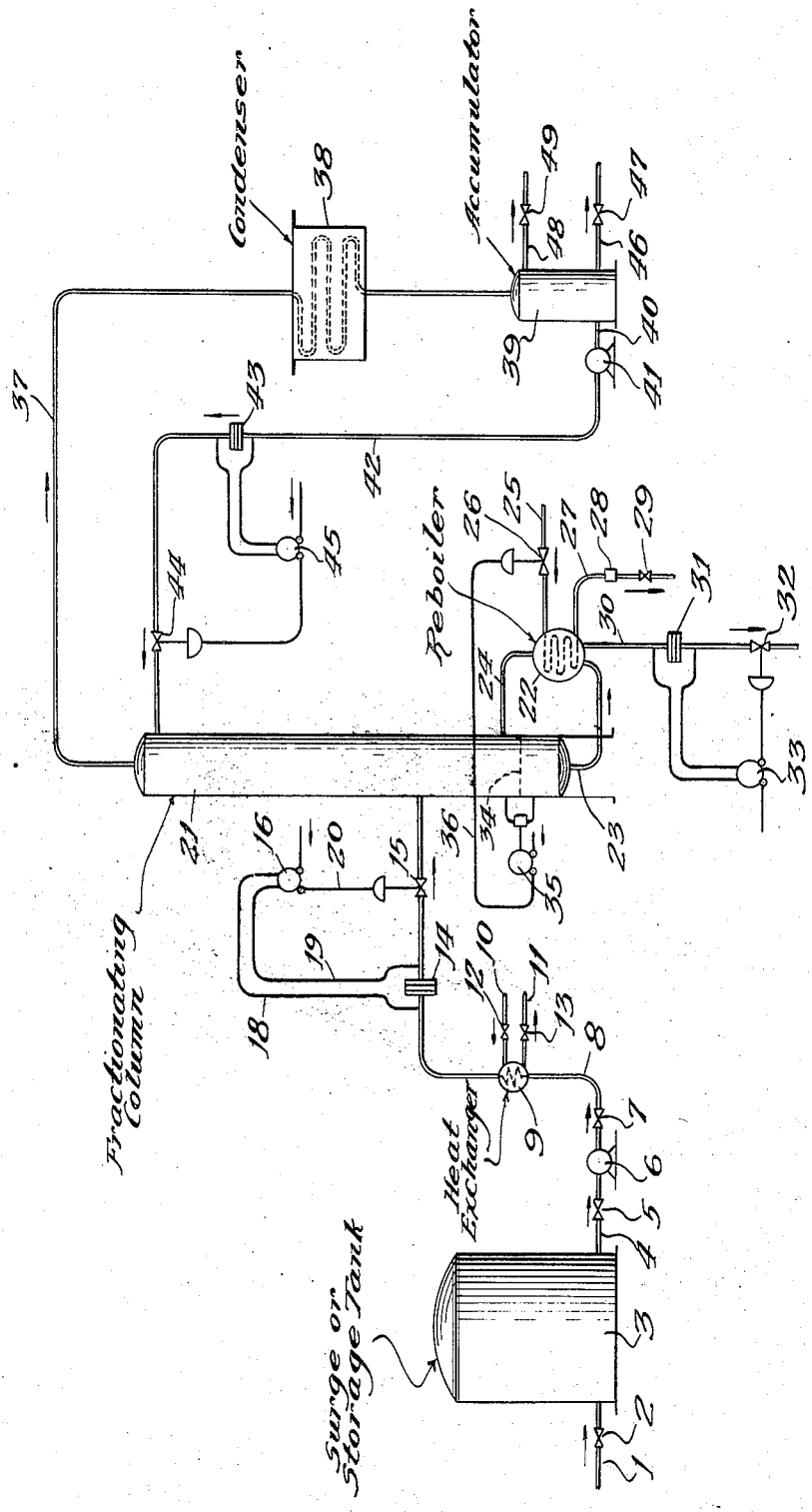
Inventor.
Edwin F. Nelson
By: Lee J. Gary
Attorney Patented Nov. 13, 1945

2,388,931

UNITED STATES PATENT OFFICE 2,388,931

FRACTIONATION

Edwin F. Nelson, Chicago, Ill., assignor to Universal Oil Products Company, Chicago, Ill., a corporation of Delaware Application January 31, 1944, Serial No. 520,578

3 Claims. (Cl. 196—94)

This invention relates to an improved method of separating close boiling multi-component fluids, and more particularly to the separation of normally liquid or gaseous hydrocarbons, from a mixture containing two or more fractions of different boiling materials.

The present trend in the petroleum refining industry is toward the synthesis and recovery of relatively pure hydrocarbons. In many instances the recovery of pure hydrocarbons from a mixture of varying boiling point materials is not readily accomplished in conventional systems.

The present invention offers a simple and relatively stable system for the separation of relatively close boiling fluids, for example, hydrocarbons either normally liquid or normally gaseous.

Conventional fractionation systems are operated on the basis of maintaining substantially constant operating pressures and substantially constant temperatures. Of course, there necessarily must be a temperature gradient from low at the top of the column to high at the bottom in order to maintain a separation of different boiling fractions. The temperature differential in the column from top to bottom is dependent upon several different factors including the boiling range of the material being treated. In general, by means of automatic temperature control an endeavor is made to hold the temperature at one point in the column substantially constant. This becomes difficult to accomplish as the differences in boiling range of the fractions decreases as extremely small changes in either temperature or pressure appreciably changes the purity of the desired products.

The present invention by controlling fractionation without temperature control eliminates some of the difficulties which have been encountered in conventional fractionating systems.

Briefly, the present invention comprises a fractionating system in which fractionation is controlled by a proportionation of the charging stream into definite fractions of high and low boiling materials. By charging to the column a substantially constant rate of feed of substantially uniform quality, and controlling vaporization in the column to maintain a substantially constant quantity of liquid therein, if from the bottom of the column a relatively high boiling fraction of substantially uniform quality material corresponding to a predetermined portion of the charge is withdrawn continuously, an overhead product of a substantially uniform quantity and quality will result.

By withdrawing from the bottom of the column a greater or lesser quantity of material than the higher boiling component that is present in the charge, it is possible to obtain a bottoms product containing more or less of the lower boiling material present in the charge. The degree of separation, of course, will be dependent to a large extent upon the efficiency of the particular column being used. When employing the present invention for obtaining a higher purity bottoms fraction the controllers should be set so that the withdrawn material from the bottom of the column is less in quantity than the proportion thereof present in the feed to the column. Also, in cases where it is desired that the lower boiling product be of higher quality, the controller should be set so that the material withdrawn from the bottom of the column is greater than the proportion of higher boiling material which is present in the feed to the column.

The invention can best be described and explained in conjunction with the accompanying diagrammatic drawing which represents an elevational view of one specific form of apparatus in which the improved process herein provided may be conducted.

Referring to the drawing, charging material is supplied by means of line 1 and valve 2 to surge or storage tank 3. This vessel should be of such a size that variations in the proportions of different boiling materials supplied through line 1 are substantially equalized and a material of fairly uniform quality is withdrawn through line 4 and valve 5 by pump 6. From pump 6 the charging material is directed through valve 7 and line 8 into heat exchanger 9. In heat exchanger 9 the charging material is heated to the desired temperature by means of a suitable heating medium introduced to and withdrawn from the heat exchanger by means of lines 10 and 11 and valves 12 and 13, respectively. After passing through heat exchanger 9 the charging material is directed through an orifice flange 14 and a flow control valve 15 after which it passes into fractionating column 21. Orifice 14 and flow control valve 15 operate in conjunction with a suitable flow control instrument 16, by means of which the pressure differential across orifice 14 communicated to instrument 16 by means of lines 18 and 19 is converted to impulses transmitted from instrument 16 by means of conduit 20 to valve 15 and which function to open or close the latter in response to decreases or increases in the flow of fluid through line 8.

By means of a suitable size surge tank 3 and by controlling the flow of fluid at a substantially constant rate by means of orifice 14 and valve 15, it is possible to regulate the charge to fractionating column 21 so that it is at a substantially uniform rate and of a substantially uniform quality.

Fractionating column 21 may be any of the conventional types now in common use containing suitable packing or bubble trays not shown. Heat is supplied to the lower portion of the column by means of reboiler 22, which communicates with the column through conduits 23 and 24. Heat is supplied to the reboiler by means of a suitable heat convective fluid such as steam introduced through line 25, and control valve 26 and in case steam is employed the condensate is withdrawn from the reboiler by means of line 27, trap 28, and valve 29. The bottoms product from the fractionator is withdrawn at a substantially constant rate through line 30, orifice 31, and valve 32. Orifice 31 and valve 32 operate in conjunction with a suitable flow control instrument 33, similar to instrument 16. Instrument 33 operates to vary the setting of valve 32 in response to differentials in pressure across orifice 31, similar to the operation of instrument 16.

In desired instances it is possible to automatically control the proportionation of the column. That is, by interconnecting instruments 16 and 33 in a manner which is well known to the art so that instrument 16 operates to reset instrument 33, it is possible to automatically regulate the quantity of bottoms withdrawn to maintain it at a rate corresponding to a definite proportion of the feed.

The flow of heating fluid into reboiler 22 is controlled in response to variations in the liquid level in fractionating column 21 as indicated by the broken line 34. This control of heating fluid is accomplished by means of control valve 26 and a suitable conventional type of liquid level control instrument 35. The flow control instrument may be of the external float cage type as illustrated or when desired an internal float may be utilized. The variations in the position of the float function to vary air pressure in line 36 which in turn functions to vary the opening or closing of valve 26. With an increase of the liquid level in the column the instrument is so arranged that control valve 26 will open thus allowing more heating fluid to enter the reboiler and cause a more rapid vaporization of the liquid in the bottom of the fractionating column. With a lowering of the liquid level in the column, control instrument 35 and valve 26 will function to decrease the heating medium supplied to the reboiler thus reducing the degree of vaporization of the liquid in the column.

The vaporous materials from the top of the column are withdrawn through line 37 and pass through condenser 38, the condensed materials being collected in accumulator 39. A portion of this condensed material is withdrawn through line 40 and directed by means of pump 41 through line 42, orifice 43, and control valve 44 into the upper portion of the fractionating column to serve as reflux for the column. Orifice 43 and control valve 44 are interconnected with a suitable flow control instrument 45 and function to maintain the flow of reflux through line 42 at a substantially constant rate. The operation of instrument 45 is similar to that described for instruments 16 and 33. By varying the setting of instrument 45 it is possible to maintain any reflux ratio that may be desired.

The overhead product from the fractionating column is withdrawn from accumulator 39 through line 46 and valve 47. In cases where complete condensation has not been accomplished and excessive pressure has built up in the system, the uncondensed gases or vapors may be withdrawn through line 48 controlled by valve 49.

To illustrate the utility of the invention, assume that the charge to the column comprises a two component mixture containing equal portions of each component. If in this case, for example, it was desired to obtain relatively pure product containing the higher boiling of the two components, the flow control instrument for the bottom product would be set at such a rate that less than 50% of the charge would be withdrawn therethrough. The exact difference between percentage of the higher boiling component in the charge and the percentage of the charge which is withdrawn from the bottoms which will give the desired quality of product will be dependent upon the efficiency of the fractionating column. By withdrawing a regulated proportion of the charge as a bottom product, maintaining the charge at a substantially uniform rate and of a substantially constant quality, and maintaining the liquid level in the bottom of the column and the reflux rate substantially constant, the overhead product will also be of a substantially constant quality and at a substantially uniform rate.

I claim as my invention:

1. A method of fractionating a multi-component fluid material which comprises introducing said material at a substantially uniform rate into a fractionating column, withdrawing liquid at a substantially uniform rate from the bottom of said fractionating column, removing vaporous material overhead from said column, cooling said vaporous material and supplying a portion of the resultant condensate at a substantially uniform rate to the top of said fractionating column as reflux therefor, and supplying heat to the bottom of said column at a rate varying in response to changes in the liquid level in the bottom of said column, said rate being increased with increasing liquid level and decreased with decreasing liquid level.

2. A method of fractionating a multi-component fluid material which comprises introducing said material at a substantially uniform rate into a fractionating column, withdrawing liquid at a substantially uniform rate from the bottom of said fractionating column, removing vaporous material overhead from said fractionating column, cooling said vaporous material, and supplying a portion of the resultant condensate at a substantially uniform rate to the top of said fractionating column as reflux therefor, and controlling the degree of vaporization in said fractionating column by increasing the heat supplied to the bottom of said column in response to increases in the liquid level in the bottom of said column and decreasing the heat supplied to the bottom of the column in response to decreases in said liquid level.

3. A method of separating narrow boiling range hydrocarbons into low and high boiling fractions which comprises introducing said hydrocarbons at a substantially uniform rate into a fractionating column, withdrawing a liquid fraction at a substantially uniform rate from the bottom of said fractionating column as said high boiling fraction, removing vaporous material overhead from said column as said low boiling fraction, cooling said vaporous material and supplying a portion of the resultant condensate at a substantially uniform rate to the top of said fractionating column as reflux therefor, and controlling the degree of vaporization in said fractionating column by increasing the heat supplied to the bottom of said column in response to increases in the liquid level in the bottom of said column and decreasing the heat supplied to the bottom of the column in response to decreases in said liquid level.

EDWIN F. NELSON.